United States Patent Office 2,892,696
Patented June 30, 1959

2,892,696

METHOD OF SUPPRESSING PLANT GROWTH WITH 2,2,3-TRICHLOROPROPIONITRILE

Keith C. Barrons, Midland, Mich., assignor to The Dow Chemical Company, Midland, Mich., a corporation of Delaware No Drawing. Application November 13, 1956
Serial No. 621,540

5 Claims. (Cl. 71—2.7)

This invention relates to herbicides and is particularly directed to a composition and method for the control of the growth of germinant seeds and emerging seedlings of many undesirable seed species.

It is an object of the present invention to provide a new and improved method for the suppression and control of the growth of undesirable vegetation. A further object is to provide a method for the suppression of the growth of germinant seeds, emerging seedlings and particularly those of narrow leaved plants such as grasses in soil or other growth media which is planted with the seeds of many broad leaved crop plants. Another object is the provision of a novel composition adapted to be employed for the accomplishment of the new method of growth control. Other objects will become apparent from the following specification and claims.

According to the present invention, it has been discovered that the growth of germinant seeds, emerging seedlings and established vegetation may be controlled by exposing the seeds or the roots of the emerging seedlings or established plants to the action of 2,2,3-trichloropropionitrile. More particularly, it has been discovered that the growth of many germinant seeds and emerging seedlings and especially those of grasses may be suppressed by exposing the germinant seeds and emerging seedlings to the action of a growth inhibiting amount of the propionitrile compound. 2,2,3-trichloropropionitrile is a colorless liquid which boils at 55°–56° C. and has the following formula:

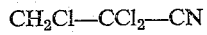

This compound is somewhat soluble in many organic solvents and of very low solubility in water. It has been found to have a high toxicity against the germinant seeds and emerging seedlings of many grass species. Thus, it may be employed for the selective control of the germinant seeds and emerging seedlings of various grasses in growth media planted with many broad leaved plants such as cotton, radish and lettuce. Furthermore, 2,2,3-trichloropropionitrile has a high degree of persistency in soil and gives excellent controls of many undesirable plant species for periods ranging up to several months. Also, the trichloropropionitrile compound permeates soil for a distance of several inches from the point of application depending upon the temperature, moisture content, compactness and physical consistency of the soil.

The introduction of the 2,2,3 - trichloropropionitrile compound into soil or growth media gives rise to varying degrees of response in germinant seeds, emerging seedlings and growing plants depending upon the nature of the seeds or plants and the dosage dispersed in the growth media as well as the weathering conditions of temperature and moisture. When very large dosages are dispersed in growth media, a temporary inhibition of seeds, seedlings and established plants is obtained. This approaches a sterilizing action. A weathering action of the sun and rain and possibly the decomposition of the toxic compounds by the action of bacteria and other soil organisms eventually frees the growth media of the toxicant. More dilute dosages of the 2,2,3-trichloropropionitrile compound suppress the growth of the seeds and emerging seedlings of many grass species while having little or no effect upon the seeds and emerging seedlings of many broad leaved plants or upon the established plants of many broad leaved species. Thus, it is possible to effect a selective treatment of mixed seedlings of grasses and many broad leaved plants.

The distribution of a growth inhibiting amount of the 2,2,3-trichloropropionitrile compound in soil is essential and critical for the practice of the present invention. In non-selective applications to growth media, good controls are obtained when a dosage of toxicant is applied in the amount of from about 4 to 200 parts or more by weight per million parts by weight of the media. In applications to soil, good results are obtained when the 2,2,3-trichloropropionitrile compound is distributed at a rate of from about 0.5 pound to 120 pounds or more per acre and through such a cross-section of the soil as to provide for the presence therein of an effective concentration of the treating agent. In such applications, it is desirable that the compound be distributed to a depth of at least 0.5 inch and at a substantially uniform dosage of at least 1.0 pound per acre-inch of soil. In selective applications for the control of germinat seeds and emerging seedlings of many undesirable weeds and particularly those of narrow leaved plants such as grasses in areas planted with seeds of many broad leaved plants, a dosage of from 4 to 82 parts by weight of toxicant per million parts by weight of soil may be employed. In such applications, the exact dosage to be employed is dependent upon the resistance of the broad leaved plant or its seeds to the toxicant compound.

The method of the present invention may be carried out by applying to and mixing with growth media the unmodified 2,2,3-trichloropropionitrile compound. However, the present method also embraces the employment of a liquid or dust composition containing said compound. In such usage, the compound may be modified with one or a plurality of additaments or herbicide adjuvants such as water, petroleum distillates or other liquid carriers; surface-active dispersing agents; and finely divided inert solids. Depending upon the concentration of the toxicant, such augmenting compositions are adapted to be distributed in the soil or employed as concentrates and subsequently diluted with additional inert carrier to produce the ultimate treating compositions. The required amount of the toxicant compound in the gorwth media conveniently may be supplied per acre treated in from 40 to 27,000 gallons or more of the liquid carrier or in from about 50 to 2,000 pounds of the inert solid carrier.

The exact concentration of the 2,2,3-trichloropropionitrile compound to be employed in compositions for the treatment of growth media may vary provided the required dosage of effective agent is supplied. The concentration of toxicant in liquid compositions employed to supply the desired dosage generally is from about 0.001 to 50 percent by weight although as high a concentration as 90 percent by weight may be employed. In dusts, the concentration of toxicant may be from about 1 to about 30 percent by weight. In compositions to be employed as concentrates, the toxicant may be present in a concentration of from about 5 to 95 percent by weight.

Liquid compositions containing the desired amount of the 2,2,3-trichloropropionitrile compound may be prepared by dissolving the toxicants in an organic liquid such as acetone, xylene or petroleum distillates or by dispersing the toxicants in water with the aid of a suitable surface-active dispersing agent such as an ionic or nonionic emulsifying agent. The aqueous compositions may contain one or more water-immiscible solvents for the 2,2,3-trichloropropionitrile compound. In such compositions, the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the 2,2,3-trichloropropionitrile compound is dispersed in and on a finely divided inert solid such as talc, chalk, gypsum and the like. In such operations, the carrier is mechanically ground with the compounds or with a volatile organic solvent solution thereof. Similarly, dust compositions containing the compound may be prepared from various solid surface-active dispersing agents such as bentonite, fuller's earth, atapulgite and other clays. Depending upon the proportions of ingredients, these dust compositions may be employed as concentrates and subsequently diluted with additional solid surface-active dispersing agents or with talc, chalk, gypsum and the like to obtain the desired amount of active ingredient in a composition adapted to be applied for the control of the growth of vegetation. Also, such concentrate dust compositions may be dispersed in water with or without the aid of a dispersing agent to form spray mixtures.

When operating in accordance with the present invention, growth inhibiting amounts of the compound or a composition containing the toxicant are dispersed in any convenient fashion in soil or other growth media, i.e., by simple mixing with the growth media, by applying to the surface of the soil and thereafter dragging or disking into the soil to the desired depth, by injection or drilling techniques whereby the toxicant is deposited beneath the surface of the soil or by employing a liquid carrier to accomplish the penetration and impregnation. The application of the spray and dust compositions may be carried out by conventional methods, for example with power dusters, boom or hand sprayers and spray dusters.

In a further method, the distribution may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the invention but are not to be construed as a limitation thereof:

Example 1

25 parts by weight of 2,2,3-trichloropropionitrile, 10 parts of Triton X-155 and 65 parts of xylene are mixed together to prepare a concentrate composition in the form of an emulsifiable liquid.

In a similar manner, 25 parts by weight of 2,2,3-trichloropropionitrile, 72 parts of diatomaceous earth, 2 parts of an alkyl aryl sulfonate (Nacconal NR) and 2 parts of a polymerized sodium salt of a substituted benzoic alkyl sulfonic acid (Daxad No. 27) are mechanically mixed and ground together to prepare a concentrate composition in the form of a wettable powder.

Also, a mixture of 20 parts by weight of 2,2,3-trichloropropionitrile, 0.1 part of Nacconal NR, 0.1 part of Daxad No. 27 and 200 parts of water are ball milled together to produce a water-dispersible concentrate composition.

These concentrate compositions are adapted to be dispersed in water to prepare aqueous compositions having very desirable wetting and penetrating properties. The latter aqueous compositions are adapted to be employed to treat soil and distribute the propionitrile compound therein in growth inhibiting concentrations.

Example 2

2,2,3-trichloropropionitrile was dissolved in fuel oil to prepare a herbicide composition containing 21.6 grams of the propionitrile compound per liter of ultimate mixture. This composition was employed for the treatment of seed beds of sandy loam soil of good nutrient content. The treatment was carried out by injection whereby the propionitrile compound was distributed in the soil at dosages of 20 to 80 pounds per acre. Just prior to the treatment, the seed beds were planted with the rhizomes of Johnson grass. Other seed beds of untreated soil were similarly planted with Johnson grass rhizomes to serve as checks.

After six weeks, the treated seed beds were examined and compared with the untreated beds to determine what control of the growth of the Johnson grass rhizomes had been obtained. The examination showed a 100 percent control of the Johnson grass rhizomes in the soil treated at both dosages of 2,2,3-trichloropropionitrile. At the time of the observations, the untreated check beds were found to support abundant and vigorously growing stands of Johnson grass.

Example 3

2,2,3-trichloropropionitrile was dispersed in water to prepare an aqueous composition containing 0.51 gram of the propionitrile compound per liter of solution. A portion of this composition was employed to treat seed beds of sandy loam soil of good nutrient content. In the treating operations, the aqueous composition was applied to the seed beds as a soil drench and at a dosage of about 0.43 acre-inch of aqueous composition per acre to distribute 50 pounds of the propionitrile compound per acre. This corresponds to a dosage of about 82 parts by weight of 2,2,3-trichloropropionitrile per million parts by weight of soil. Following the application, the seed beds were watered in an amount corresponding to about 3 acre-inches per acre of rainfall per month.

Just prior to the applications, certain of the seed beds had been planted with seeds of corn, Japanese millet, soybeans and wild oats. Others of the treated seed beds were planted with the same named species at intervals of 3, 7, 15, etc. days following the applications. In a check operation, untreated seed beds of the same soil type were planted at the same intervals to the named plant species. Three weeks following each planting operation, the seed beds were examined to determine the percent of control of the growth of the germinant seeds and emerging seedlings. The results are set forth in the following table:

| Time of Planting Expressed as Number of Days After Treatment of Soil | Percent Control of the Growth of Germinant Seeds and Emerging Seedlings | | | |
|---|---|---|---|---|
| | Corn | Japanese Millet | Soybeans | Wild Oats |
| 0 | 98 | 99 | 97 | 97 |
| 3 | 100 | 100 | 99 | 100 |
| 7 | 100 | 100 | 99 | 100 |
| 15 | 100 | 100 | 99 | 100 |
| 30 | 80 | 50 | 95 | 20 |

At the time of observations, the corresponding check beds were found to support lush and abundant stands of the named plant species.

Example 4

2,2,3-trichloropropionitrile was dispersed in water to produce aqueous compositions containing 0.05, 0.125 and 0.51 gram of active agent per liter of ultimate mixture. These compositions were employed for the treatment of areas of soil which had been planted with various grass species and broad leaf plants. In the treating operations, the compositions were applied as a soil drench at a rate of about 0.43 acre-inch of aqueous composition per acre to supply substantially uniform dosages of 5, 12.5 and 50 pounds, respectively, of 2,2,3-trichloropropionitrile per acre. These dosages correspond, respectively, to concentrations of about 8.2, 20 and 82 parts by weight of 2,2,3-trichloropropionitrile per million parts by weight of soil. Other areas similarly seeded with the various plant species were left untreated to serve as checks.

After three weeks, the treated areas were examined and compared with the untreated areas to determine what percent control of the growth of germinant seeds and emerging seedlings had been obtained. The results are set forth in the following table:

| Seed Species | Percent Control of the Growth of Seeds and Emerging Seedlings at the Indicated Dosage in Pounds of 2,2,3-Trichloropropionitrile Per Acre | | |
|---|---|---|---|
| | 5 | 12.5 | 50 |
| Lettuce | 0 | 0 | 0 |
| Radish | 0 | 0 | 0 |
| Millet | 90 | 90 | 95 |
| Wild Oats | | 85 | 90 |

At the time of the observations, abundant and vigorously rowing stands of the named plant species were found in the untreated checks.

*Example 5*

2,2,3-trichloropropionitrile was employed for the treatment of sandy loam soil supporting a heavy stand of established Johnson grass which was from 4 to 6 inches tall. In such operations, the propionitrile compound was injected at 10-inch intervals in rows spaced 10 inches apart and at a depth of about 6 inches below the soil surface. The amount of propionitrile compound employed was sufficient to provide dosages of 40 and 80 pounds of toxicant per acre. Adjacent but similar stands of Johnson grass were left untreated to serve as checks.

Six weeks after treatment, the plots were examined to determine what control of Johnson grass had been obtained. The examination showed a 100 percent control of Johnson grass in the soil treated at both dosages of 2,2,3-trichloropropionitrile. At the time of the observations, the untreated check areas were found to support lush and abundant stands of Johnson grass.

The expression "growth media" is employed in the present specification and claims in its broadest sense to be inclusive of all conventional "soils" as defined in Webster's New International Dictionary, second edition, unabridged, published in 1937 by G. and C. Merriam Company, Springfield, Massachusetts. Thus, the term refers to any substances or media in which vegetation may take root and grow and is intended to include not only earth but also compost, manure, muck, humus, sand and the like adapted to support plant growth. The term "seed" is employed in its broad agricultural meaning and is inclusive of any propagative portion of a plant, including true seeds and seed like fruits, tubers, rhizomes, bulbs, etc.

2,2,3-trichloropropionitrile as employed in the present invention may be prepared by the chlorination of acrylonitrile. In carrying out the reaction, chlorine gas is passed through a solution of acrylonitrile in carbon tetrachloride or chloroform at about 50° to 70° C. Upon completion of the reaction, the reaction mixture is fractionally distilled to separate the desired product as a colorless liquid.

I claim:
1. A method for the selective suppression of the germinant seeds and emerging seedlings of narrow leaved grasses in soil planted with broad leaved plants which comprises distributing 2,2,3-trichloropropionitrile in such soil in the amount of from 4 to 82 parts by weight per million parts by weight of soil.

2. A method useful for the suppression of the growth of plants which comprises impregnating soil with an aqueous dispersion of a composition comprising from 5 to 95 percent by weight of 2,2,3-trichloropropionitrile in admixture with a surface active dispersing agent, the aqueous dispersion containing at least 0.001 percent by weight of 2,2,3-trichloropropionitrile and the impregnation being carried out so as to provide at least 4 parts by weight of 2,2,3-trichloropropionitrile per million parts by weight of soil.

3. A method useful for the suppression of the growth of vegetation which comprises applying to and mixing with a growth medium a growth inhibiting amount of 2,2,3-trichloropropionitrile.

4. A method useful for the suppression of the growth of vegetation which comprises impregnating soil with 2,2,3-trichloropropionitrile in the amount of at least 4 parts by weight per million parts by weight of soil.

5. A method useful for the suppression of the growth of vegetation which comprises impregnating soil with a composition comprising 2,2,3-trichloropropionitrile as an active ingredient in intimate admixture with an inert herbicide adjuvant as a carrier therefor, the impregnation being carried out so as to provide at least 4 parts by weight of the active agent per million parts by weight of soil.

References Cited in the file of this patent

UNITED STATES PATENTS

| 2,231,838 | Sichty | Feb. 11, 1941 |
| 2,344,105 | Peters | Mar. 14, 1944 |
| 2,390,470 | Sumner | Dec. 4, 1945 |
| 2,472,347 | Sexton | June 7, 1949 |
| 2,807,530 | Barrons | Sept. 24, 1957 |

OTHER REFERENCES

Barrons et al. in "Down to Earth," vol. 10, No. 3, Winter 1954, page 16.

Cotton et al. in "Journal of Economic Entomology," vol. 39, pages 529–31 (1946).